United States Patent
Yu et al.

(10) Patent No.: US 11,529,884 B2
(45) Date of Patent: Dec. 20, 2022

(54) VEHICLE-BASED MICROGRID HAVING DYNAMICALLY ADDABLE AND REMOVABLE BATTERY SYSTEMS

(71) Applicant: Ford Global Technologies, LLC, Dearborn, MI (US)

(72) Inventors: Lan Yu, Canton, MI (US); Michael W. Degner, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 160 days.

(21) Appl. No.: 17/127,312

(22) Filed: Dec. 18, 2020

(65) Prior Publication Data
US 2022/0194258 A1 Jun. 23, 2022

(51) Int. Cl.
*B60L 53/80* (2019.01)
*H02J 3/38* (2006.01)
*H02J 3/32* (2006.01)
*B60L 55/00* (2019.01)

(52) U.S. Cl.
CPC ............ *B60L 53/80* (2019.02); *H02J 3/32* (2013.01); *H02J 3/381* (2013.01); *B60L 55/00* (2019.02)

(58) Field of Classification Search
CPC ... B60L 53/80; B60L 55/00; H02J 3/32; H02J 3/381; H02J 3/38
See application file for complete search history.

(56) References Cited

U.S. PATENT DOCUMENTS

| | | |
|---|---|---|
| 2010/0308653 A1 | 12/2010 | Gestri |
| 2013/0041516 A1 | 2/2013 | Rockenfeller et al. |
| 2014/0297051 A1 | 10/2014 | Zhang et al. |
| 2014/0300182 A1 | 10/2014 | James |
| 2022/0009373 A1* | 1/2022 | Patel ................. B60L 53/64 |

FOREIGN PATENT DOCUMENTS

WO 2013015773 A1 1/2013

* cited by examiner

*Primary Examiner* — Robert L Deberadinis
(74) *Attorney, Agent, or Firm* — David B. Kelley; Brooks Kushman P.C.

(57) ABSTRACT

A vehicle-based microgrid includes a controller and a vehicle having a power source and a network. The controller is operable to operate the power source to supply power to the network for consumption by loads on the network and to adjust operation of the power source in supplying power to the network upon a battery source being added to the network. The power source may be (i) a traction battery, (ii) an electrical generator, or (iii) a non-traction battery. The battery source may be (i) a battery that is on-board the vehicle and that is not the power source or (ii) a battery that is off board the vehicle.

17 Claims, 5 Drawing Sheets

VEHICLE-BASED MICROGRID HAVING DYNAMICALLY ADDABLE AND REMOVABLE BATTERY SYSTEMS

TECHNICAL FIELD

The present invention relates to vehicle-based microgrids.

BACKGROUND

A vehicle-based microgrid which uses just the traction battery of an electric vehicle for energy storage has limited potential to meet the needs of various users. For example, one user may want a large traction battery having significant energy storage that allows operation of the vehicle and microgrid for significant amounts of time with the engine of the vehicle off. Another user may not have such a requirement and instead may prefer a small traction battery thereby freeing up vehicle cargo space, reducing vehicle weight, and lowering vehicle cost. The traditional approach to this problem is to size the traction battery for the majority of users (e.g., the "once size fits all" approach), thereby resulting in many users not being totally satisfied.

SUMMARY

A vehicle-based microgrid is provided. The vehicle-based microgrid includes a controller and a vehicle having a power source and a network. The controller is operable to operate the power source to supply power to the network for consumption by loads on the network and to adjust operation of the power source in supplying power to the network upon a battery source being added to the network.

The controller may be operable to operate the battery source to supply power to the network to account for adjusted operation of the power source whereby the power supplied to the network for consumption by the loads on the network is unchanged.

The controller may be further operable to readjust operation of the power source in supplying power to the network upon the battery source being removed from the network.

The vehicle may include a plurality of power sources. In this case, the controller may be further operable to operate the power sources to supply power to the network for consumption by loads on the network and to adjust operation of the power sources in supplying power to the network upon the battery source being added to the network.

The controller may be further operable to further adjust operation of the power source and/or adjust operation of the first battery source in supplying power to the network upon a second battery source being added to the network. In this case, the controller may be further operable to further adjust operation of the power source and/or adjust operation of the second battery source upon the first battery source being removed from the network.

The battery source may be a battery that is on-board the vehicle and that is not the power source. The battery source may be a battery that is off board the vehicle.

The power source may be an electrical generator of the vehicle. The vehicle may be an electric vehicle ("EV") having a traction battery. In this case, the power source may be the traction battery of the EV. The vehicle may be a non-electric vehicle (i.e., a vehicle lacking a traction battery) having a non-traction battery (i.e., a battery other than a traction battery). In this case, the power source may be the non-traction battery.

The vehicle-based microgrid may further include a second vehicle having a power source. In this case, the controller may be further operable to adjust operation of the power source of the second vehicle in supplying power to the network upon the battery source being added to the network.

A method for a vehicle-based microgrid having a vehicle including a power source, a network, and a controller is also provided. The method includes operating, by the controller, the power source to supply power to the network for consumption by loads on the network. The method further includes adjusting, by the controller, operation of the power source in supplying power to the network upon a battery source being added to the network. The battery source may be either (i) a battery that is on-board the vehicle and that is not the power source or (ii) a battery that is off board the vehicle. The power source may be (i) a traction battery, (ii) an electrical generator, or (iii) a non-traction battery.

A vehicle is also provided. The vehicle includes a controller, a network, and a power source. The controller is operable to operate the power source to supply power to the network for consumption by loads on the network and to adjust operation of the power source in supplying power to the network upon a battery source being added to the network. The battery source is either (i) a battery that is on-board the vehicle and that is not the power source or (ii) a battery that is off board the vehicle. The power source may be (i) a traction battery, (ii) an electrical generator, or (iii) a non-traction battery.

As described herein, embodiments of the present invention relate to a vehicle-based microgrid having an infrastructure to attach additional batteries thereto and a controller that can coordinate energy use between on-board energy sources and off-board energy sources for microgrid use and on-board energy sources for vehicle use.

The vehicle-based microgrid allows multiple, completely self-capable or modular battery systems ("battery" or "battery module") to be joined together to form the vehicle-based microgrid, including being dynamically added to or removed from the vehicle-based microgrid. The battery systems may be joined in the vehicle-based microgrid either as on-board vehicle battery modules that are added directly to the vehicle of the vehicle-based microgrid or as external, stationary battery modules that are off-board of the vehicle.

Communication with the battery systems may be required to assess power and energy capabilities. The vehicle-based microgrid may change its functionality and capability in response to having either more or less energy storage available. To extend vehicle on-board battery life, a controller (e.g., a vehicle-based microgrid battery manager, such as a microgrid management system or a vehicle management system as described herein) may use just a microgrid battery system, without utilizing any on-board vehicle battery, when the vehicle is operating to provide the vehicle-based microgrid.

The manager may operate the vehicle and microgrid such that only the modular batteries are used during microgrid operation, allowing the vehicle on-board battery to be saved for driving. The manager monitors the various energy sources (e.g., microgrid modular batteries) and energy loads connected to the microgrid. From this data, the manager can determine the optimal utilization of energy sources. For example, the manager may determine which combination of energy sources, such as on-board generator, on-board energy storage, microgrid modular battery, solar, wind, etc., to supply the loads. The manager may communicate with other vehicle systems to indicate the amount of energy storage available for the vehicle to utilize. The vehicle systems and manager may then determine how much energy storage is available for microgrid operation, and how much is available for vehicle energy management purposes.

When multiple vehicles participate in the vehicle-based microgrid, and several modular batteries are attached with the vehicles, the manager may change the control strategy to coordinate use of the available energy. For instance, the manager may selectively choose which modular battery to utilize while holding some in reserve.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
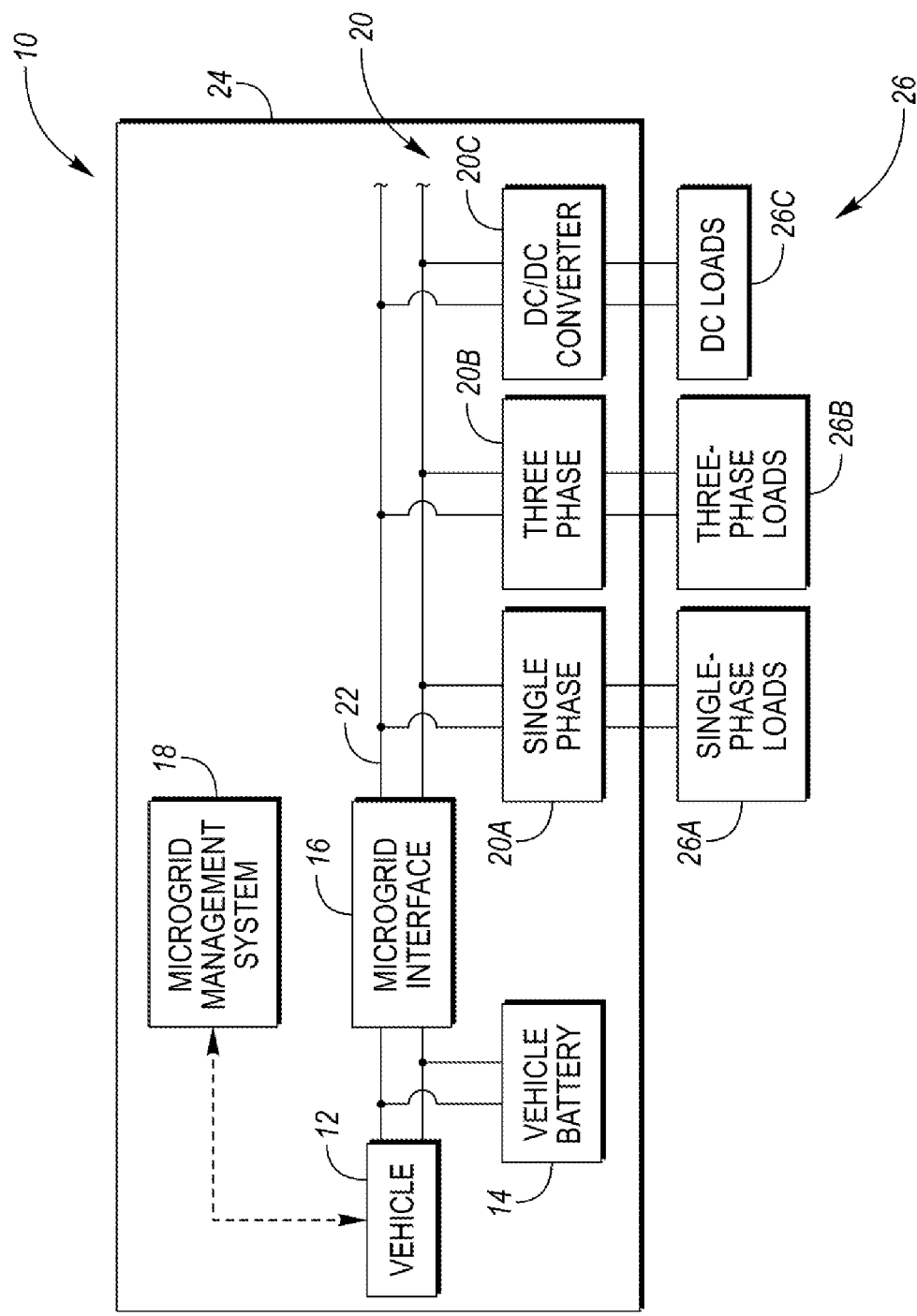
FIG. 1 illustrates a schematic diagram of a vehicle-based microgrid.

Referring now to FIG. 1, a schematic diagram of a vehicle-based microgrid 10 is shown. Vehicle-based microgrid 10 is implemented with an electric vehicle ("EV") 12. EV 12 may be either a hybrid EV having a traction battery and an engine or a battery only EV having a traction battery and no engine. In this description, EV 12 will be considered as being a hybrid EV having a traction battery and an engine. In other embodiments, vehicle-based microgrid 10 is implemented with a non-electric vehicle (i.e., a vehicle having an engine but lacking a traction battery).

Vehicle-based microgrid 10 includes EV 12, an on-board battery (i.e., a traction battery) 14 of the EV, a microgrid interface 16, a microgrid management system ("MMS") 18, one or more microgrid components, generally indicated by reference numeral 20, and a communication and power distribution network 22. EV 12, traction battery 14, microgrid interface 16, and microgrid components 20 are interconnected via network 22.

EV 12 may function as a source of DC (direct current) electrical energy for vehicle-based microgrid 10. In this regard, EV 12 is configured to function as an electrical generator. Particularly, EV 12 is configured to generate AC (alternating current) electrical energy, convert the generated AC electrical energy into DC electrical energy, and output the DC electrical energy onto network 22 for use by loads connected to the network. The generation of electrical energy by EV 12 can be integrated into the powertrain of the EV, e.g., a hybrid or plug-in hybrid powertrain, and/or as a stand-alone generator, either connected directly to the powertrain or as a separate engine generator combination. EV 12 outputs DC electrical energy generated by the electrical generator of the EV via an output port. The output port of EV 12 is connected to network 22 for the DC electrical energy from the electrical generator of the EV to be outputted onto the network. An alternative way to transfer energy through network 22 is to divert energy generated by the electrical generator of EV 12 into traction battery 14 and then output the DC energy from traction battery 14 through network 22 when needed. In this case, the electrical generator of EV 12 may not directly connect to network 22.

The electrical generator of EV 12 may be disconnected from network 22 (i.e., not be connected to the network) and therefore not be a part of vehicle-based microgrid 10. Regardless of whether the electrical generator of EV 12 is connected to or disconnected from network 22, the EV is otherwise connected to the network for communication/management purposes of vehicle-based microgrid 10.

Irrespective of vehicle-based microgrid 10, traction battery 14 provides a source of electrical energy used for propelling EV 12. As part of vehicle-based microgrid 10, traction battery 14 may function as a source or as a load of DC electrical energy for the vehicle-based microgrid. In this regard, assuming traction battery 14 is not fully charged, traction battery 14 may receive DC electrical energy from sources connected to network 22. Conversely, assuming traction battery 14 is not fully discharged, traction battery 14 may provide DC electrical energy onto network 22 for use by loads connected to the network. Further, traction battery 14 may be disconnected from network 22 (i.e., not be connected to the network) and therefore not be a part of vehicle-based microgrid 10. As is the case with the electrical generator of EV 12, regardless of whether traction battery 14 is connected to or disconnected from network 22, the EV is otherwise connected to the network for communication/management purposes of vehicle-based microgrid 10.

Microgrid interface 16 is a hardware interface arranged in network 22 and functions as a single point of contact between, on the one hand, EV 12 and traction battery 14, and, on the other hand, microgrid components 20. Microgrid interface 16 connects the electrical generator of EV 12 with microgrid components 20 and connects traction battery 14 with the microgrid components.

Microgrid interface 16 is operable as a power interface for distributing electrical energy between sources and loads on network 22. For instance, microgrid interface 16 is operable for distributing electrical energy from the electrical generator of EV 12 and/or from traction battery 14 (i.e., sources) to microgrid components 20 for use by loads connected to the microgrid components. Likewise, microgrid interface 16 is operable for distributing electrical energy from sources connected to microgrid components 20 to traction battery 14 (i.e., a load). As such, microgrid interface 16 is operable for distributing electrical energy between sources (or loads) located in network 22 on one side of the microgrid interface and loads (or sources) located in the network on the other side of the microgrid interface.

Similarly, microgrid interface 16 is operable as a power interface for distributing electrical energy between sources and loads located in network 22 on the same sides of the microgrid interface. For instance, microgrid interface 16 is operable for distributing electrical energy from the electrical generator of EV 12 (i.e., a source) to traction battery 14 (i.e., a load), which are located in network 22 on one side of the microgrid interface. Likewise, microgrid interface 16 is operable for distributing electrical energy from sources connected to microgrid components 20 to loads connected to other microgrid components, which are all located in network 22 on the other side of the microgrid interface.

Microgrid interface 16 is also operable as a communications interface for distributing communications between devices on network 22 acting as controllers/monitors and devices on the network acting as controlled/monitored devices. For instance, microgrid interface 16 is operable for distributing control signals from a vehicle management system of EV 12 and/or from MMS 18 (i.e., controller devices) to microgrid components for controlling the microgrid components (i.e., controlled devices). Likewise, microgrid interface 16 is operable for distributing status signals (e.g., amount of electrical energy being consumed/requested by loads, timing of loads being connected/disconnected to/from network 22, etc.) from microgrid components 20 (i.e., monitored devices) to the vehicle management system of EV 12 and/or to MMS 18 (i.e., monitor devices).

MMS 18 is configured for controlling the microgrid operations of EV 12, traction battery 14, and microgrid components 20. For instance, MMS 18 can command the electrical generator of EV 12 to output a certain amount of electrical energy and command traction battery 14 to output a certain amount of electrical energy which sum to a total amount of energy requested for use by loads connected to microgrid components 20. MMS 18 is configured for monitoring the microgrid operations of EV 12, traction battery 14, and microgrid components 20. For instance, MMS 18 can monitor microgrid components 20 to detect electrical energy requirements of loads connected to the microgrid components.

MMS 18 is implemented as an electronic controller in communication with EV 12. MMS 18 may be a processor-based module of a vehicle control module system. As an electronic controller, MMS 18 includes a processor, memory, an input-output (I/O) interface, and instructions (or programs). The memory and the I/O interface are coupled to the processor for allowing communication of information between one another. The I/O interface is configured for allowing communication of information between MMS 18 and other systems, modules, controllers, devices, etc., of vehicle-based microgrid 10. The programs are stored on the memory and are accessible therefrom by the processor. During operation, the processor executes one or more of the programs to execute steps such as those described herein in connection with the operation of vehicle-based microgrid 10.

The vehicle management system of EV 12 is an electronic controller of the EV that can have the same/similar and/or complementary functionalities and responsibilities as MMS 18.

Microgrid components 20 are configured to receive electrical energy provided from sources of vehicle-based microgrid 10, convert the received electrical energy into different formats, and export the converted electrical energy to loads connected to the microgrid components. For instance, microgrid components 20 include, as shown in FIG. 1, a single-phase power converter 20*a*, a three-phase power converter 20*b*, and a DC/DC converter 20*c*. Loads, generally designated with reference numeral 26, may be connected to microgrid components 20. For instance, one or more single-phase loads 26*a* are connected to single-phase power converter 20*a*; one or more three-phase loads 26*b* are connected to three-phase power converter 20*b*; and one or more DC loads 26*c* are connected to DC/DC converter 20*c*.

Single-phase power converter 20*a* is operable for converting DC electrical power received from network 22 into single-phase AC electrical power for consumption by single-phase loads 26*a*; three-phase power converter 20*b* is operable for converting DC electrical power received from network 22 into three-phase AC electrical power for consumption by three-phase loads 26*b*; and DC/DC power converter 20*c* is operable for converting DC electrical power received from network into a higher/lower DC electrical power for consumption by DC loads 26*c*.

The electrical generator of EV 12, traction battery 14, microgrid interface 16, MMS 18, microgrid components 20, and network 22 are on-board and/or a part of the EV, as indicated in FIG. 1 by being positioned within outline 24, which contains the EV. Loads 26 are off board of EV 12, as indicated in FIG. 1 by being positioned outside of outline 24.

As described, vehicle-based microgrid 10 can provide multiple exportable power options to power various loads, e.g., single-phase loads, three-phase loads, and DC loads, at various voltage levels. Vehicle-based microgrid 10 provides an interface to integrate customized or off-the-shelf power electronics, like DC/DC converter 20*c*, to fit different output power requirements.

Figure 2:
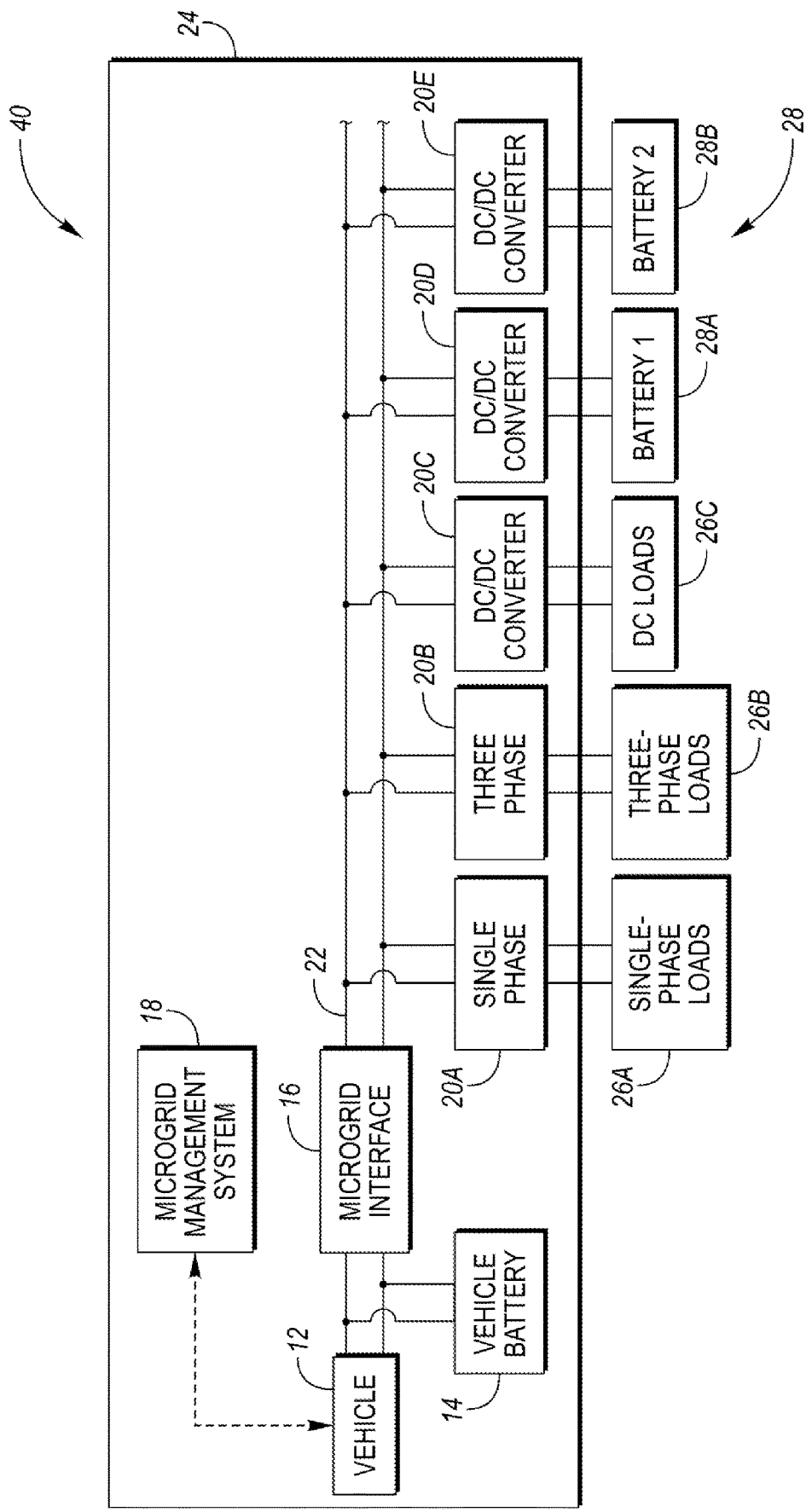
FIG. 2 illustrates a schematic diagram of a vehicle-based microgrid having dynamically addable and removable battery systems in one configuration.

Referring now to FIG. 2, with continual reference to FIG. 1, a schematic diagram of a vehicle-based microgrid 40 having dynamically addable and removable battery systems in one configuration is shown. Vehicle-based microgrid 40 includes the components of vehicle-based microgrid 10 and these components are designated with the same reference numerals.

Vehicle-based microgrid 40 represents a solution to the above-noted problem of the "once size fits all" traction battery 14. Vehicle-based microgrid 40 solves this problem by being extendable, relative to vehicle-based microgrid 10, with one or more dynamically addable and removable battery systems, generally designated with the reference numeral 28. Battery systems 28 are self-capable batteries or modular battery systems and represent a modular battery concept which allows additional energy resource with energy storage, e.g., renewable energy resource with incorporated energy storage, to be added to vehicle-based microgrid 40.

Each battery system ("battery" or "battery module") 28 may be in the form of either (i) an on-board vehicle battery module or (ii) a stationary, external battery module. An on-board vehicle battery module is a battery module that may be added to EV 12 any time after the EV has been assembled with traction battery 14. EV 12 can have one or more on-board vehicle battery modules and thereby the vehicle-based microgrid can be extended with the one or more on-board vehicle battery modules. An on-board vehicle battery module added to EV 12 can be removed from the EV while leaving traction battery 14, and any other on-board vehicle battery modules added to the EV, in place. An external battery module is a battery module that may be added off-board from EV 12 to the vehicle-based microgrid. An external battery module is "external" in that it is off board from EV 12 and is stationary in that it is generally fixed in place. External battery modules can be connected to vehicle-based microgrid 40 while EV 12 is parked. The vehicle-based microgrid can be extended with one or more external battery modules. An external battery module added to the vehicle-based microgrid can be removed while leaving any other off-board sources or loads in place.

Vehicle-based microgrid 40 shown in the configuration in FIG. 2 further includes two external battery modules 28a and 28b relative to vehicle-based microgrid 10 shown in FIG. 1. External battery modules 28a and 28b are indicated in FIG. 2 as being off-board EV 12 by being positioned outside of outline 24. External battery modules 28a and 28b connect to vehicle-based microgrid 40 via respective microgrid components 20d and 20e in the form of DC/DC converters. As an example, at least one of external battery modules may be a relatively much larger battery (i.e., much higher energy storage capacity) than traction battery 14.

Battery modules 28, whether in the form of on-board vehicle battery modules or external battery modules, may be installed or added to and removed from vehicle-based microgrid 40 at any time. Vehicle-based microgrid 40 and battery modules 28 have plug-and-play capability thereby allowing the battery modules to be added to or removed from vehicle-based microgrid 40 while EV 12 and/or the vehicle-based microgrid are active. As such, vehicle-based microgrid 40 having EV 12 with a "one size fits all" sized traction battery 14 can be made to have additional energy storage by adding one or more of the battery modules thereto whether by being added on-board the EV (i.e., an on-board vehicle battery module) or by being added off-board the EV (i.e., an external battery module).

Figure 3:
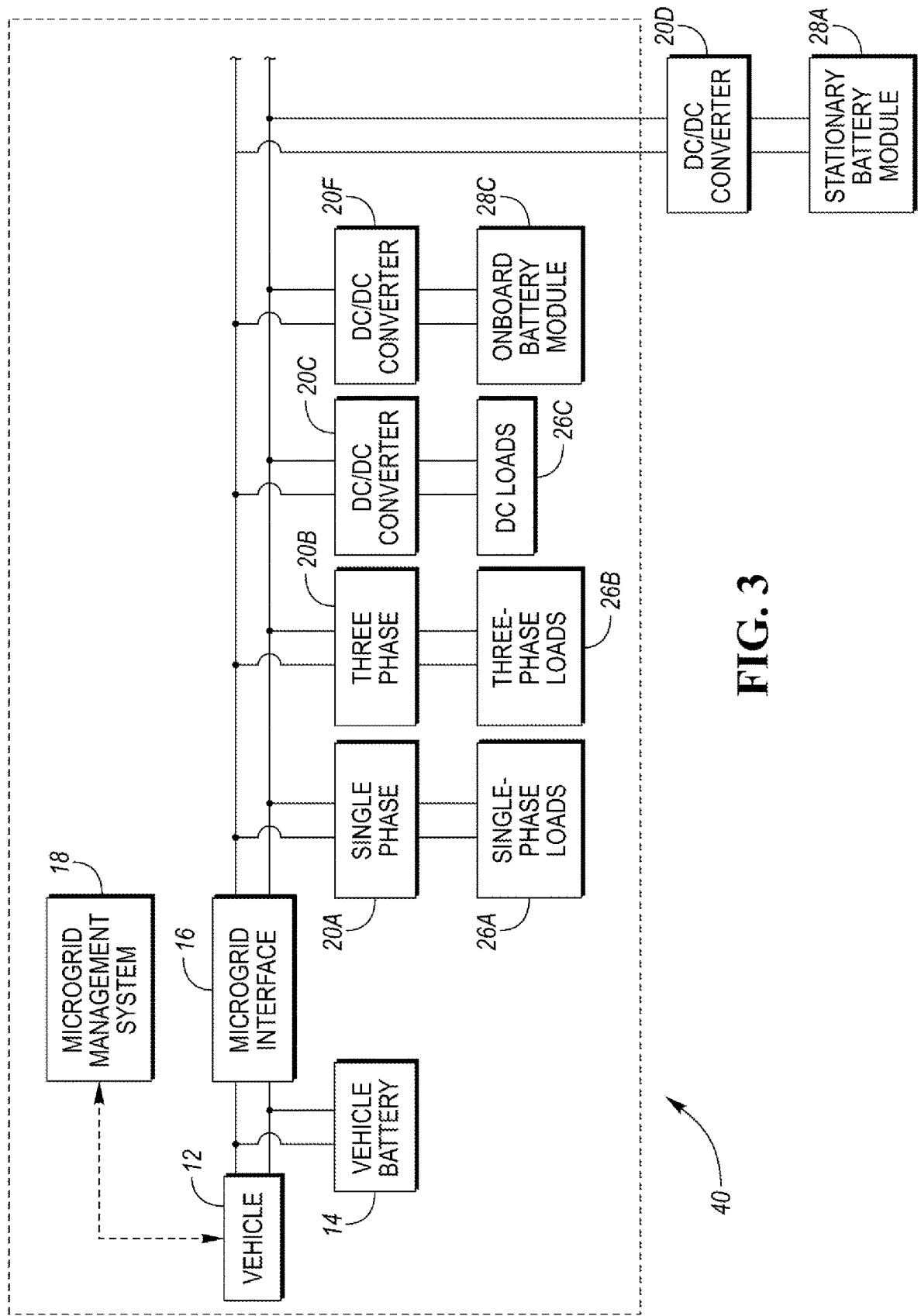
FIG. 3 illustrates another schematic diagram of the vehicle-based microgrid having dynamically addable and removable battery systems in another configuration.

Referring now to FIG. 3, with continual reference to FIGS. 1 and 2, another schematic diagram of vehicle-based microgrid 40 having battery modules 28 in another configuration is shown. In this case, vehicle-based microgrid 40, relative to vehicle-based microgrid 10 shown in FIG. 1, further includes external battery module 28a and an on-board vehicle battery module 28c. On-board vehicle battery module 28c is connected to vehicle-based microgrid 40 via a microgrid component 20f in the form of a DC/DC converter. On-board vehicle battery module 28c is indicated in FIG. 3 as being on-board EV 12 by being positioned within outline 24.

Figure 4:
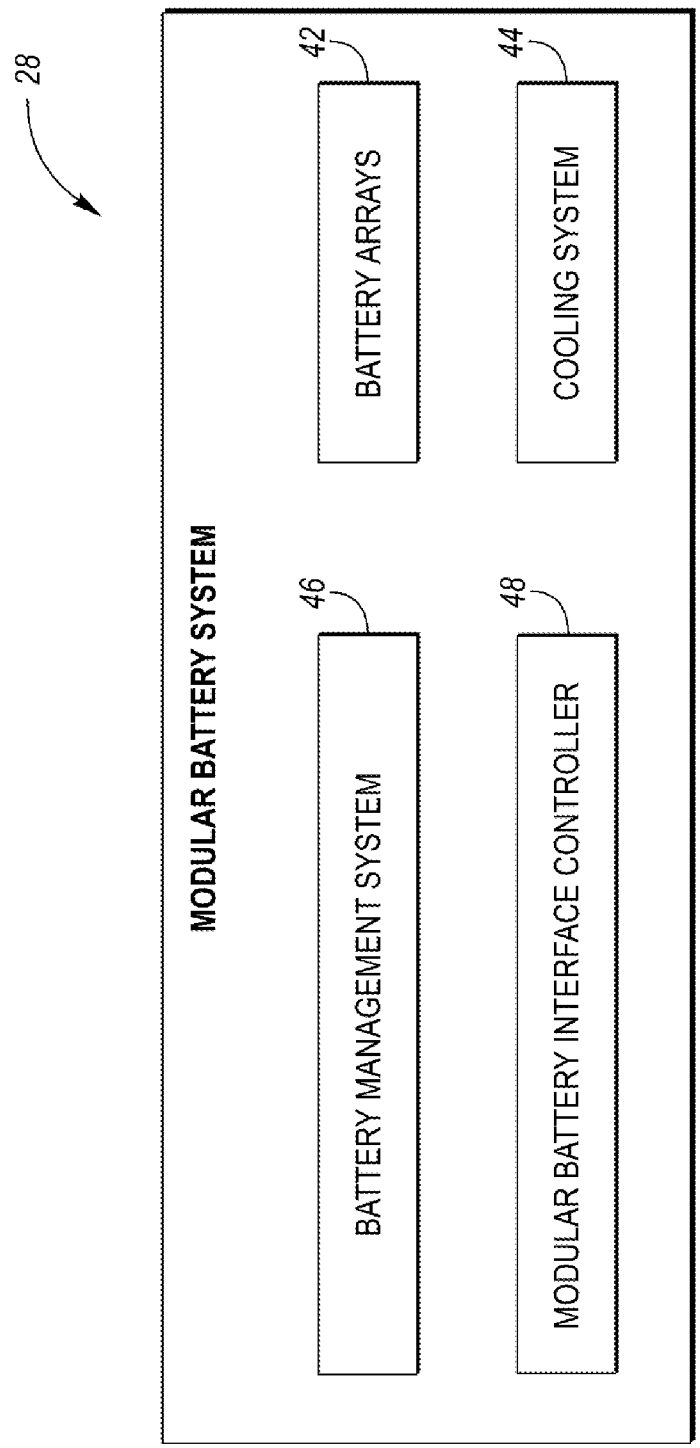
FIG. 4 illustrates a block diagram of the internal components and sub-systems of a dynamically addable and removable battery system.

Referring now to FIG. 4, a block diagram of the internal components and sub-systems of a battery module 28 is shown. Battery module 28 includes battery arrays 42, a thermal management system (or "cooling system") 44, a battery management system 46, and a modular battery interface controller 48. Modular battery interface controller 48 communicates with either MMS 18 or the vehicle management system of EV 12, via microgrid component 20 to which battery module 28 is connected to, to share the capability, status, health, etc., of the battery module. In this regard, the connection between battery module 28 and the corresponding microgrid component 20 (for example, external battery module 28a and DC/DC converter 20d; or on-board vehicle battery module 28c and DC/DC converter 28f) includes power leads and communication leads. Battery module 28 can have plug-and-play capability, allowing the modular battery to be added to or removed from a vehicle-based microgrid while the vehicle-based microgrid is active.

Figure 5:
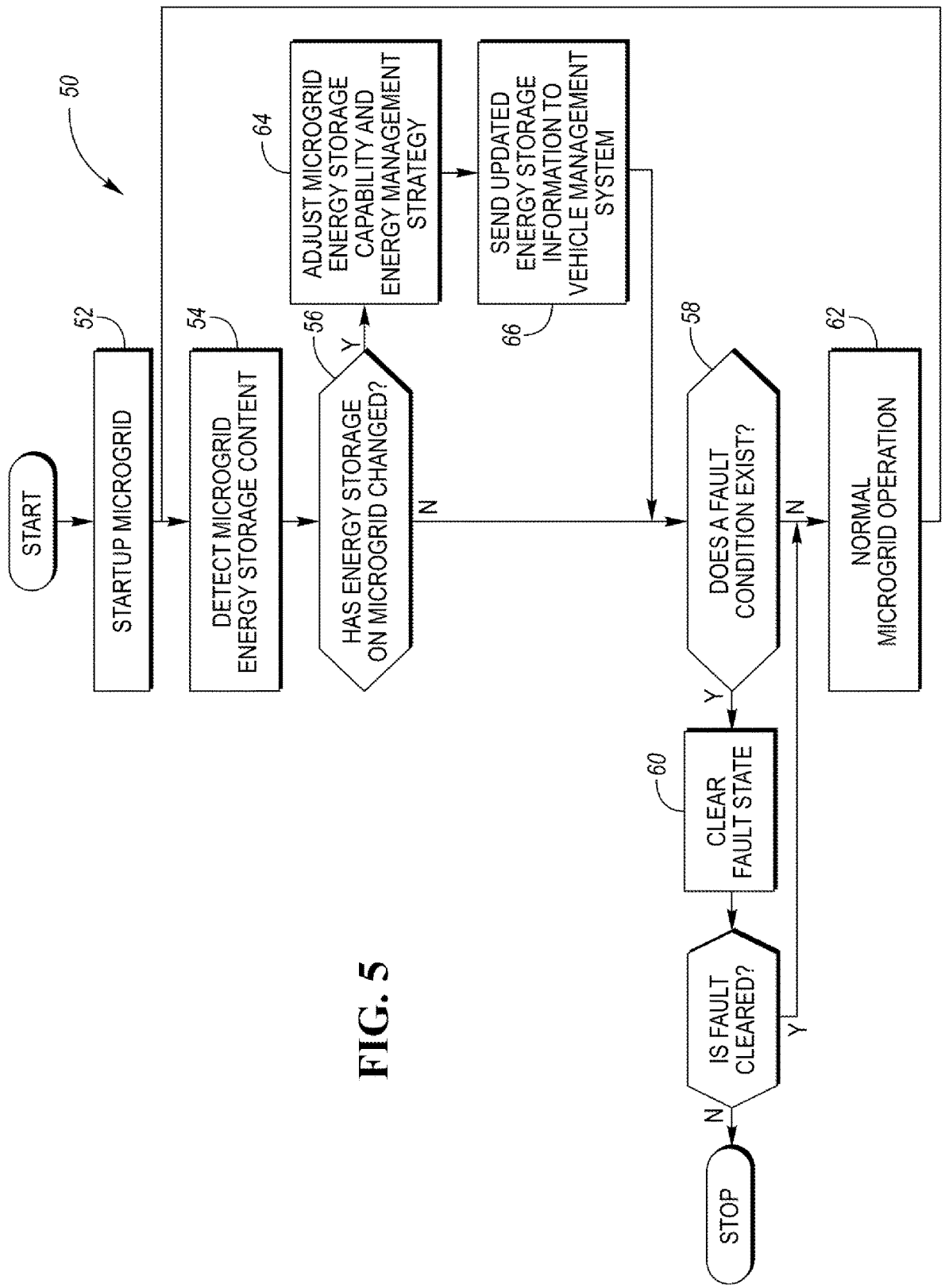
FIG. 5 illustrates a flowchart describing operation of a microgrid management system of a vehicle-based microgrid in automatically reconfiguring an energy management strategy employed by the vehicle-based microgrid when an energy source, such as a battery system, is added to or removed from the vehicle-based microgrid.

Referring now to FIG. 5, a flowchart 50 describing operation of MMS 18 of a vehicle-based microgrid in automatically reconfiguring the energy management strategy employed by the vehicle-based microgrid when an energy source, such as a battery module 28, is added to or removed from the vehicle-based microgrid is shown. In general, MMS 18 is operable to change how the vehicle-based microgrid operates when a source is added to or removed from the vehicle-based microgrid and/or when a load is added to or removed from the vehicle-based microgrid.

For instance, MMS 18 may change how the vehicle-based microgrid operates when a battery module 28, either an on-board vehicle battery module or an external battery module, is added to the vehicle-based microgrid in order to take advantage of the extra energy storage provided by the battery module. That is, MMS 18 reconfigures the vehicle-based microgrid in response to a battery module 28 being added to the vehicle-based microgrid. In this case, MMS 18 may command traction battery 14 to stop supplying energy to network 22 and instead command battery module 28 to provide this energy to the network. This allows for more efficient operation of the powertrain, longer electric only driving, and extended engine-off idle operation.

Likewise, MMS 18 reconfigures the vehicle-based microgrid in response to a battery module 28 being removed from the vehicle-based microgrid. In this case, MMS 18 may command the electrical generator of EV 12, traction battery 14, and/or some other battery module(s) 28 already present in the vehicle-based microgrid to provide more energy to account for the removed battery module.

As noted above, MMS 18 is an electronic controller that is in communication with the vehicle management system of EV 12. MMS 18 can monitor the status of loads and sources in the vehicle-based microgrid, including the status of battery modules 28 added to the vehicle-based microgrid, communicating their status with the vehicle management system, and perform data collection and monitoring. Examples of functions of MMS 18 include: manage the exported power flow through each microgrid outlet; manage the energy flow among energy sources (engine, on board generator, vehicle battery pack, and extended modular batteries) and various loads (vehicle and exported power load); monitor the power quality of each exportable power outlet; monitor the extended modular batteries status, for example, state of charge, health condition, etc.; and communicate with the vehicle management system of the EV and battery management systems 46 of battery modules 28.

The operation shown in flowchart 50 begins with starting up the vehicle-based microgrid, as indicated in block 52, and detecting energy storage content of the vehicle-based microgrid, as indicated in block 54. Detecting energy storage content of the vehicle-based microgrid includes MMS 18 detecting the sources of the vehicle-based microgrid. For instance, as shown in FIG. 1, the sources of the vehicle-based microgrid may just be the electrical generator of EV 12 and traction battery 14. The operation of the vehicle-based microgrid during these conditions may include supplying energy from the electrical generator of EV 12 and traction battery 14 onto network 22; microgrid interface 16 providing the energy from these sources to microgrid components 20 via the network; microgrid components 20 converting the received energy into appropriate forms; and loads 26 receiving the energy in the appropriate form from their associated microgrid components.

MMS 18 continually detects the energy storage content of the vehicle-based microgrid, as indicated in block 54, to determine any change in the energy storage content of the vehicle-based microgrid, as indicated in decision block 56. The energy storage content of the vehicle-based microgrid changes when a source is added to or removed from the vehicle-based microgrid. For instance, when a battery module 28 is added to or removed from the vehicle-based microgrid the energy storage content of the vehicle-based microgrid changes.

MMS 18 is operable to detect the sources (and the loads) of the vehicle-based microgrid. For instance, when the vehicle-based microgrid has the configuration shown in:

FIG. 1, MMS 18 detects that the electrical generator of EV 12 and traction battery 14 are the sources of the vehicle-based microgrid; FIG. 2, MMS 18 detects that the electrical generator of the EV, the traction battery, and external battery modules 28a and 28b are the sources of the vehicle-based microgrid; and FIG. 3, MMS 18 detects that electrical generator of the EV, the traction battery, external battery module 28a, and on-board vehicle battery module 28c are the sources of the vehicle-based microgrid.

While the energy storage content of the vehicle-based microgrid remains unchanged, MMS 18 detects whether a fault condition exists, as indicated in decision block 58, and works to clear any fault state present, as indicated in block 60. While there are no fault states, the vehicle-based microgrid operates normally, as indicated in block 62. The normal operation of the vehicle-based microgrid includes MMS 18 operating the vehicle-based microgrid according to an energy management strategy based on the capabilities and rank of the sources present in the vehicle-based microgrid and the requirements of the loads present in the vehicle-based microgrid.

The energy storage content of the vehicle-based microgrid changes when a source, such as a battery module 28, is added to or removed from the vehicle-based microgrid. For instance, the energy storage content of the vehicle-based microgrid having the configuration of FIG. 1 changes when external battery module 28a and on-board vehicle battery module 28c are added to the vehicle-based microgrid such that vehicle-based microgrid has the configuration of FIG. 3.

When MMS 18 detects in decision block 56 that the energy storage content of the vehicle-based microgrid has changed, the MMS functions to adjust the energy storage capability and the energy management strategy of the vehicle-based microgrid accordingly, as indicated in block 64. In conjunction, MMS 18 sends updated energy storage information to the vehicle management system of EV 12, as indicated in block 66. Alternately, MMS 18 skips block 66 should there be no interaction with the vehicle management system of EV 12 in this aspect. MMS 18 then operates the vehicle-based microgrid according to the adjusted energy storage capability and energy management strategy based on the updated sources present in the vehicle-based microgrid, per block 62.

The vehicle management system may also perform the operations of MMS 18 shown in FIG. 5. In this case, flowchart 50 would differ for the vehicle management system in that block 66 ("send the updated energy storage information to vehicle management system") would be removed.

As described, as shown in the configurations of the vehicle-based microgrid in FIGS. 2 and 3, the power level and duration of exportable power for the vehicle-based microgrid solution is not limited by the capacity of the traction battery of the EV. Thus, various types of functions can be done with the same vehicle. With the assistance of one or more extended battery modules, the vehicle-based microgrid can provide additional benefits such as (1) better fuel economy, (2) longer driving range under EV mode of plug-in hybrid electric vehicle; (3) reduce engine operation since plug-in hybrid electric vehicle is able to operate longer at EV mode; and (4) extend engine off idle operation.

The following examples provide further description of vehicle-based microgrids in accordance with embodiments of the present invention. In one example, the vehicle-based microgrid includes a full hybrid electric vehicle with limited on-board energy storage (i.e., small traction battery). In a first scenario of this example, when the vehicle is parked and does not export power as a microgrid, the engine of the vehicle could remain off the entire time the vehicle is parked. In a second scenario of this example, when the vehicle is exporting power as a microgrid, the engine could be run continuously since there is insufficient on-board energy storage. In a third scenario of this example, when the vehicle is exporting power as a microgrid with battery module(s) attached to the microgrid, because of the extra energy buffer provided by the battery module(s), the engine does not have to operate all of the time.

In another example, the vehicle is powering a microgrid that includes other generating sources such as wind turbine, solar panels, etc. In a first scenario of this example, when only the vehicle on-board energy storage is available, the microgrid controller (i.e., MMS 18) and the vehicle will need to operate such as the power draw from the loads are satisfied and will not be able to store excess wind/solar energy for later use; this could mean that the engine needs to run more often, that the vehicle battery life could be diminished, and that the vehicle and microgrid controller will need to react to sudden changes of renewable energy generation. In a second scenario of this example, when the microgrid has additional battery module(s) thereto, the microgrid controller and the vehicle can decide which generating source, including the battery module(s), to use optimally, and to store excess energy in the battery module(s).

The following examples provide description about how the vehicle or vehicle-based microgrid behave differently with an added battery module. In a first example, the battery module is used to change the vehicle control strategy. For instance, to maximize or extend the life of the vehicle on-board battery, the vehicle based microgrid battery management could only use the battery module, without utilizing vehicle on-board battery, when the vehicle is operating as a microgrid. In a second example, when multiple vehicles participate in a microgrid and several on-board battery modules are attached into some of those vehicles, the control strategy can be changed to coordinate those vehicles. For instance, the vehicles could selectively choose which battery module(s) to utilize and which to hold in reserve. In a third example, the battery module(s) allows the vehicle energy management strategy to be changed. For instance, the energy management strategy could operate the vehicle and the microgrid such that only the battery module(s) are used during microgrid operation, allowing the vehicle on-board battery to be used only for driving. This could be utilized to maximize fuel economy, minimize noise, or minimize emissions. In a fourth example, the microgrid control system closely monitors the energy sources (i.e., battery modules) and energy loads connected to the microgrid. From this data it then determines the optimal utilization of energy sources. For example, it determines which combination of energy sources, such as on-board generator, on-board energy storage, on-board battery module, off-board battery module, solar, wind, etc., to supply the loads. In a fifth example, the microgrid control system (i.e., the MMS) communicates to the vehicle management system and informs the vehicle management system the amount of energy storage available for the vehicle to utilize. The vehicle management system and the MMS can then determine how much energy storage is available for microgrid operation and how much is available for vehicle energy management purposes.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A vehicle-based microgrid comprising:
a vehicle having a power source and a network, the network including an infrastructure enabling one or more battery sources to be added to the network while power is being distributed across the network;
a battery source added on-board the vehicle while power is being distributed across the network; and
a controller operable to operate the power source to supply power to the network for consumption by loads on the network and to adjust operation of the power source in supplying power to the network upon the battery source being added to the network and to operate the battery source to supply power to the network to account for adjusted operation of the power source whereby the power supplied to the network for consumption by the loads on the network is unchanged.

2. The vehicle-based microgrid of claim 1 wherein:
the controller is further operable to readjust operation of the power source in supplying power to the network upon the battery source being removed from the network.

3. The vehicle-based microgrid of claim 1 wherein:
the vehicle includes a plurality of power sources; and
the controller is further operable to operate the power sources to supply power to the network for consumption by loads on the network and to adjust operation of the power sources in supplying power to the network upon the battery source being added to the network.

4. The vehicle-based microgrid of claim 1 wherein:
the battery source is a first battery source; and
the controller is further operable to further adjust operation of the power source and/or adjust operation of the first battery source in supplying power to the network upon a second battery source being added to the network.

5. The vehicle-based microgrid of claim 4 wherein:
the controller is further operable to further adjust operation of the power source and/or adjust operation of the second battery source upon the first battery source being removed from the network.

6. The vehicle-based microgrid of claim 4 wherein:
the second battery source is on-board the vehicle.

7. The vehicle-based microgrid of claim 4 wherein:
the second battery source is off board the vehicle.

8. The vehicle-based microgrid of claim 1 wherein:
the vehicle is an electric vehicle having a traction battery; and
the power source is the traction battery of the electric vehicle.

9. The vehicle-based microgrid of claim 1 wherein:
the power source is an electrical generator of the vehicle.

10. The vehicle-based microgrid of claim 1 wherein:
the vehicle is a non-electric vehicle having a non-traction battery; and
the power source is the non-traction battery.

11. The vehicle-based microgrid of claim 1 further comprising:
a second vehicle having a power source; and
the controller is further operable to adjust operation of the power source of the second vehicle in supplying power to the network upon the battery source being added to the network.

12. A method for a vehicle-based microgrid having a vehicle including a power source, a network, and a controller, the network including an infrastructure enabling one or more battery sources to be added to the network while power is being distributed across the network, the method comprising:
operating, by the controller, the power source to supply power to the network for consumption by loads on the network; and
upon a battery source being added on-board the vehicle while power is being distributed across the network, adjusting, by the controller, operation of the power source in supplying power to the network upon the battery source being added to the network and operating, by the controller, the battery source to supply power to the network to account for the adjusted operation of the power source whereby the power supplied to the network for consumption by the loads on the network is unchanged.

13. The method of claim 12 further comprising:
readjusting, by the controller, operation of the power source in supplying power to the network upon the battery source being removed from the network.

14. The method of claim 12 wherein:
the power source is (i) a traction battery, (ii) an electrical generator, or (iii) a non-traction battery.

15. A vehicle comprising:
a power source;
a network including an infrastructure enabling one or more battery sources to be added to the network while power is being distributed across the network;
a battery source added on-board the vehicle while power is being distributed across the network; and
a controller operable to operate the power source to supply power to the network for consumption by loads on the network and to adjust operation of the power source in supplying power to the network upon the battery source being added to the network and to operate the battery source to supply power to the network to account for adjusted operation of the power source whereby the power supplied to the network for consumption by the loads on the network is unchanged.

16. The vehicle of claim 15 wherein:
the battery source is a first battery source;
the controller is further operable to further adjust operation of the power source and/or adjust operation of the first battery source in supplying power to the network upon a second battery source being added to the network; and
wherein the second battery source is either (i) on-board the vehicle or (ii) is off board the vehicle.

17. The vehicle of claim 16 wherein:
the power source is (i) a traction battery, (ii) an electrical generator, or (iii) a non-traction battery.

* * * * *